Patented Aug. 12, 1952

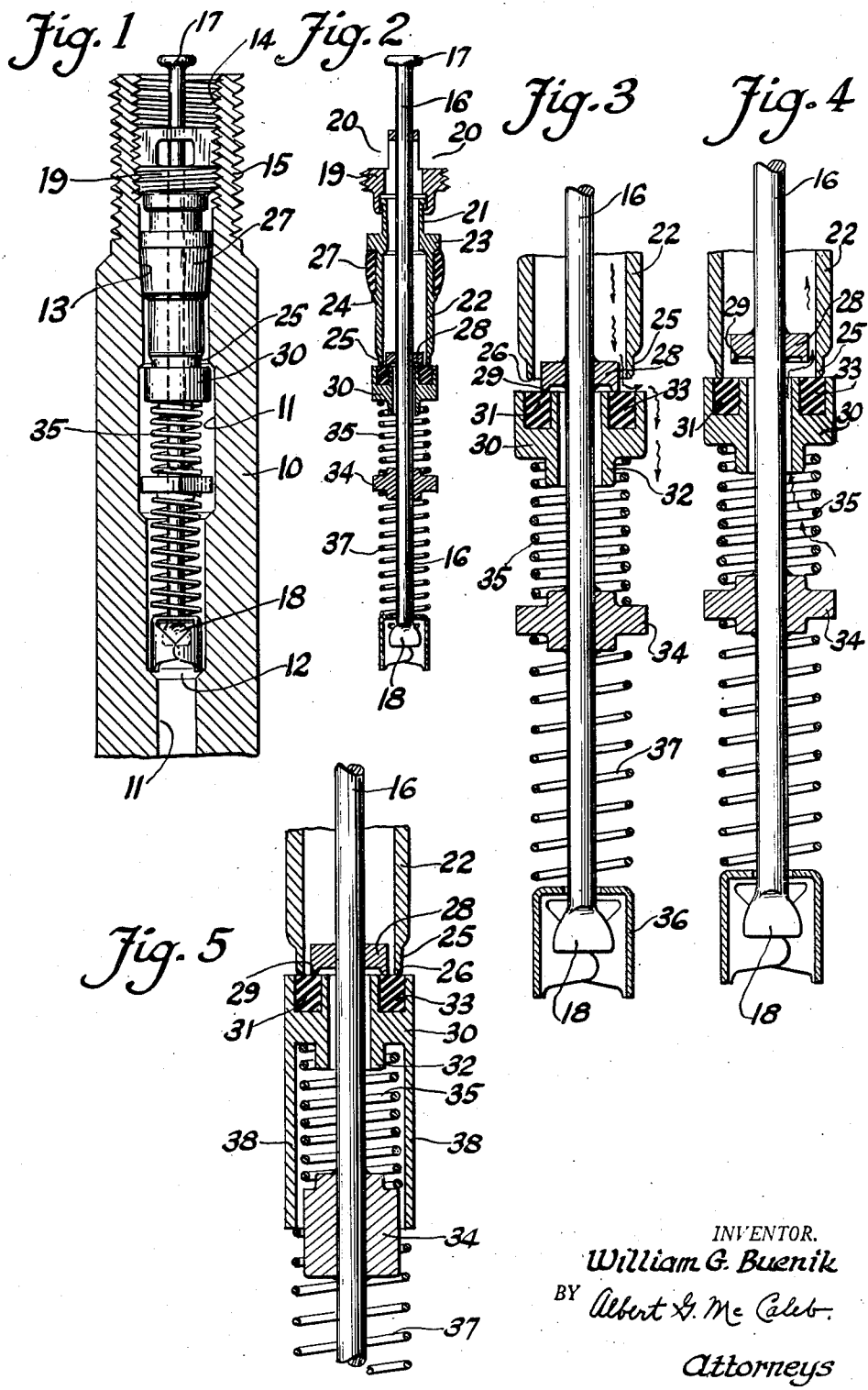

2,606,570

UNITED STATES PATENT OFFICE 2,606,570

TIRE INFLATION-RELIEF VALVE

William G. Buenik, River Forest, Ill.

Application February 11, 1948, Serial No. 7,555

7 Claims. (Cl. 137—226)

My invention relates to tire valves.

An object of my invention is to provide a generally improved tire valve which automatically relieves the pressure within its associated tire if and when that pressure attains a predetermined maximum.

Another object of my invention is to provide a valve "inside" unit capable of cooperating with an unmodified standard valve shell or stem effectively to hold the pressure within an associated tire until such pressure attains a predetermined maximum and dependably to relieve such pressure pursuant to its attainment of that predetermined maximum.

Still another object of my invention is to provide a valve "inside" unit, of the kind mentioned in the immediately preceding paragraph, which is capable of being economically manufactured, reliable in the performance of both of its principal functions, and readily properly assembled with a standard or other suitable valve shell or stem.

A salient feature of the valve "inside" unit of this invention is an annulus of relatively soft and preferably rubber-like material with which may cooperate two co-axial annuli, of metal or other relatively harder material, nested one within the other—simultaneous contact of both said nested annuli with said annulus of rubber-like material serving to hold the pressure within a tire equipped with the shell or stem with which the "inside" unit is associated; separation of one of said nested annuli from said annulus of rubber-like material permitting inflation of the tire; and separation of the other of said nested annuli from said annulus of rubber-like material relieving excess pressure within the tire.

Other objects, features and advantages of my invention will appear from the following detailed description wherein reference is made to the accompanying sheet of drawings, depicting illustrative embodiments of the invention, in which:

Figure 1 is a view in which the "inside" unit appears in side elevation and the shell or stem appears in axial section;

Figure 2 is an isolated axial sectional view of the "inside" unit as it appears when both inflow and outflow of air through the valve are prevented;

Figure 3 is a fragmentary axial sectional view, on somewhat larger scale, of the "inside" unit as it appears when inflow of air through the valve is occurring;

Figure 4 is a view, similar to Figure 3, depicting the "inside" unit as it appears when outflow of air through the valve is occurring; and Figure 5 is a fragmentary sectional view, corresponding generally with Figure 2 but on larger scale, depicting an "inside" unit of modified construction.

Similar characters of reference refer to similar parts throughout the several views.

Reference first will be made to Figures 1 to 4, both inclusive.

At 10, in Figure 1, is depicted a tire valve shell or stem which is typical of standard tire valve shells in that it is provided with an axial through passage 11 having portions of differing diameters, and presents a guide seat 12, a tapering packing seat 13, internal screw thread 14, and external screw thread 15. It will be understood that external screw thread 15, to which no further reference will be made, is intended for cooperation with a suitable valve cap (not shown).

The "inside" unit comprises a straight wire or small diameter rod 16 whereon each of the other elements of the unit is either fixedly or movably mounted; escape from the wire 16 of any of the elements movably mounted thereon being prevented by the enlarged ends 17 and 18 of the wire. End 17 of the wire is depicted as being conventionally upset, whereas end 18 is shown as being conventionally swaged.

Movably mounted upon wire 16 is a hollow nut 19 arranged to cooperate with internal thread 14 of shell 10; the upper portion of said nut 19 being cut away at 20—20 to accommodate the application of a suitable wrenching member to the nut and to facilitate the flow of air through the nut when it is threaded into the shell 10.

Swiveled into the lower end of hollow nut 19, and desirably capable of a limited amount of axial lost motion relative thereto, is the reduced upper end 21 of a tubular element 22 which also is movably mounted on wire 16. This tubular element 22 also presents a pair of axially spaced apart external shoulders 23 and 24 and is reduced in thickness at 25 to present a relatively narrow annular extremity 26. Disposed on tubular element 22, between shoulders 23 and 24, is a packing sleeve 27 suitably of relatively soft rubber-like material, which is adapted to cooperate with the packing seat 13 of the shell 10. As presently will appear, annulus 26 is one of two coaxial annuli which are nested and simultaneously engage a cooperating annulus of relatively softer material when both inflow and outflow of air through the shell 10 are prevented.

Fixed upon wire 16, and located in and having air-passing clearance with the adjacent end of tubular member 22, is a disc 28 presenting a relatively narrow ridge in the form of an annulus 29.

This annulus 29 nests coaxially with the aforementioned annulus 26, and both of said annuli contact a cooperating annulus of relatively softer material, when both inflow and outflow of air through the shell 10 are prevented.

Also movably mounted on wire 16, and having air-passing clearance therewith, is a gasket-carrier 30 which at one end is provided with an annular recess 31 and at its other end is reduced in diameter, as indicated at 32, to cooperate with one of two springs presently to be mentioned. Occupying recess 31 is an annular gasket 33 of relatively soft rubber-like material. This relatively soft annulus 33 is tightly engaged by nested annuli 26 and 29 when both inflow and outflow of air through shell 10 are prevented.

Fixed upon wire 16 is an abutment collar 34, and acting between said collar 34 and the movable gasket-carrier 30 and encircling wire 16, is a coil compression spring 35. It is the force with which spring 35 tends to separate movable gasket-carrier 30 and collar 34, and thereby hold annulus 29 in engagement with relatively softer annulus 33, which is determinative of the pressure that may be attained in the associated tire before my improved valve functions to relieve excess tire pressure. Therefore, the characteristics of spring 35 desirably are determined with finality upon its installation, under certain substantial compression, in the "inside" unit.

Also loosely mounted upon wire 16 is a sheet metal guide 36 adapted to bear against the seat 12 of shell 10; and acting between guide 36 and abutment collar 34, while encircling wire 16, is a relatively weak compression spring 37. The purpose of spring 37 merely is to keep the annulus 26 in contiguity with relatively softer annulus 33 when no air is flowing inwardly through shell 10—even though the air pressure existing within the associated tire is insufficient to keep such annuli 26 and 33 in contiguity. The exact amount of energy stored in spring 37 at any given time is not important.

All elements of the "inside" unit, except elements 27 and 33 which desirably are formed of soft rubber-like material, may be fashioned from suitable metal. By "rubber-like material" I mean true rubber or artificial rubber or other resiliently compressible materials which are capable of functioning like rubber in gasket service.

With nut 19 of my improved valve "inside" unit cooperating with internal thread 14 of the valve shell 10, as illustrated in Figure 1, the packing sleeve 27 of the "inside" unit cooperates with the packing seat 13 of the shell effectively to prevent any flow of air through shell 10, either inwardly or outwardly, which does not pass through the tubular element 22. Gasket-carrier 30 and abutment collar 34 have air-passing clearance with the portion of the shell bore 11 in which they are disposed, and sheet metal guide 36, by reason of its configuration and its clearance with the portion of the shell bore 11 in which it is disposed, permits flow of air past it in either direction at any time.

Normally annuli 26 and 29 lie nested one within the other, and both contacting the relatively softer annulus 33, to prevent any escape of air from the associated tire. When air pressure, substantially greater than the air pressure within the associated tire, exists in tubular element 22 and is therefore exerted against disc 28 and the rubber-like annular gasket 33, the gasket-carrier 30 and such annular gasket 33 recede from the annulus 26, against the pressure of spring 37, to permit inflowing air to pass between annuli 26 and 33, thence downwardly between gasket-carrier 30 and the shell 10, and between collar 34 and the shell, and thence past guide 36 to inflate the tire. In these circumstances the disc 28 follows the gasket-carrier 30 forcibly to maintain contact between the annuli 29 and 33. When the pressure in tubular element 22 no longer exceeds the tire pressure, annuli 26 and 33 resume contact with each other.

When the pressure within the associated tire attains a certain maximum, predetermined by the characteristics of spring 35 as installed in the "inside" unit, the influence of such pressure against that surface of disc 28 which is bounded by the annular ridge 29 thereof causes annulus 29 to move away from the relatively softer annulus 33 to relieve the excess pressure existing within the tire. In these circumstances, sealing contact of annulus 26 with annulus 33 is maintained. When such excess pressure has been relieved, the annuli 26 and 33 resume their sealing contact with each other.

The arrows appearing in Figures 3 and 4 indicate, respectively, paths taken in the valve by inflowing and outflowing air.

Reference is now made to Figure 5. In the modification depicted in this figure, gasket-carrier 30 is provided with a cylindrical skirt 38 of the same external diameter as such gasket-carrier 30, which skirt houses the spring 35 and telescopes with air-passing clearance the abutment collar 34. Such collar 34 now is of such diameter as to lie within spring 37, and such spring now acts between the skirt 38 and the guide 36 (not shown in Fig. 5). Except for the mentioned differences, the "inside" unit of Fig. 5 need not differ from the comparable unit of the preceding figures. In the embodiment of Fig. 5, the spring 37 exerts its influence upon gasket-carrier 30 directly rather than through collar 34 and spring 35 as in the embodiment of Figures 1 to 4.

My hereinbefore described invention fills a long felt want for a single, dependable, unobtrusive and inexpensive tire valve which, while affording all functional advantages of a conventional tire valve, acts automatically to prevent the development of excessive pressure within its associated tire. Moreover, such invention, as embodied in the hereinbefore described forms thereof, admirably meets the needs of owners of tires, equipped with conventional valves, who are desirous of protecting those tires against dangerously or otherwise undesirably high internal air pressures. All that such tire owners need do is remove the "inside" units from the shells or stems of the conventional tire valves and substitute therefor the novel "inside" units of my invention; no modification of the shells of the conventional tire valves being prerequisite to the proper cooperation therewith of the "inside" units of the instant invention.

Having illustrated and described two practical and presently preferred embodiments of my invention, I desire to secure by Letters Patent not only these two but all other embodiments of my invention as it is defined by any of the appended claims.

What I claim as new and desire to secure by Letters Patent of the United States is:

1. A valve inside unit for installation as a complete ensemble into a tire valve shell and comprising a wire deformed at its opposite ends and wherewith all of the other elements of the unit are carried, a tubular element adapted to be secured in the tire valve shell with the hereinafter mentioned extremity of the tubular member presented inwardly of the shell and away from its outer end, said tubular element and said wire being relatively movable longitudinally of each other, a gasket of relatively soft material movable longitudinally of the wire toward and away from an extremity of the tubular element, said gasket being adapted to make contact with said extremity in an endless line and said gasket normally being held against said extremity by confined air pressure existing in the valve shell, a spring having one end at a fixed position with reference to said wire for biasing the gasket toward engagement with said extremity, an air passage through said gasket, a closure for said passage, said closure being fixed to the wire and movable in said tubular element and having air-passing clearance with said tubular element, said closure being adapted to contact said gasket, to close said passage, in an endless line which circumscribes said passage and is circumscribed by the endless line of contact between the gasket and the aforesaid extremity, a second spring having one end at a fixed position relative to said wire for resiliently maintaining contact between said closure and said gasket until a predetermined pressure exists in the aforesaid passage, and means for sealing said tubular element in a tire valve shell to compel passage through said tubular element of all air flowing through the shell in either direction.

2. A valve inside unit comprising a wire wherewith the other elements of the unit are carried, a tubular element adapted to be secured in a tire valve shell with the hereinafter mentioned extremity of the tubular member presented inwardly of the shell and away from its outer end, said tubular element and said wire being relatively movable longitudinally of each other, a gasket-carrier movable longitudinally of the wire toward and away from an extremity of the tubular element, a resilient gasket carried by said gasket-carrier, said gasket being adapted to make contact with said extremity in an endless line, an air passage through said gasket-carrier and said gasket, a closure for said passage, said closure being fixed to the wire and movable in said tubular element and having air-passing clearance with said tubular element, said closure being adapted to contact said gasket, to close said passage, in an endless line which circumscribes said passage and is circumscribed by the endless line of contact between the gasket and the aforesaid extremity, a first coiled spring having one end fixed in position with respect to said wire and encircling the wire and adapted to urge the gasket and said extremity in contiguity, and a second coiled spring having one end fixed in position relative to said wire, also encircling the wire, serving forcibly to maintain contact between said closure and said gasket until a predetermined pressure exists in the aforesaid passage.

3. A valve inside unit according to claim 2 wherein an abutment collar is fixed to the wire, and the spring which maintains contact between the closure and the gasket is compressed between said collar and the gasket-carrier.

4. A valve inside unit according to claim 2 wherein an abutment collar is fixed to the wire, and the spring which maintains contact between the closure and the gasket is compressed between said collar and the gasket-carrier, and a shell-engaging guide is loosely mounted on the wire, and the other of the two springs is compressed between said collar and the guide.

5. A valve inside unit according to claim 2 wherein an abutment collar is fixed to the wire, and the spring which maintains contact between the closure and the gasket is compressed between said collar and the gasket-carrier, and the gasket-carrier is provided with a skirt which houses the spring that maintains contact between the closure and the gasket and telescopically receives the abutment collar.

6. A valve inside unit in the form of a unitary ensemble adapted for installation into a tire valve shell and comprising a central wire having deformed end portions for holding all of the parts in assembled relationship, a tubular element movable longitudinally of the wire and adapted to be secured at a fixed position in the tire valve shell with the hereinafter mentioned extremity of the tubular element presented inwardly of the shell and away from the outer end thereof, a gasket of resilient flexible material movable relative to both the wire and the shell toward and away from an extremity of the tubular element, said gasket having a surface adapted to make contact with said extremity in an endless line, said gasket being urged against said extremity by confined air pressure existing in the valve shell when the unit is in service, an air passage through said gasket through which passage the wire extends, a closure for said passage secured to the wire, said closure being movable in said tubular element and having an air-passing clearance therewith, said closure being adapted to contact said surface of the gasket, to close said passage, in an endless line which circumscribes said passage and is circumscribed by the endless line of contact between the gasket and said extremity, and a pair of springs having adjacent ends fixed in position longitudinally of the wire, the other end of one spring acting against said gasket to cause the said one spring to maintain contact between said closure and said gasket, the other end of the other spring acting against the valve shell to cause said other spring to cooperate with said one spring to maintain contact between said extremity and said gasket.

7. An inside unit to be inserted in the shell passage of a tire valve wherein an internal shoulder is provided, said inside unit comprising a wire wherewith the other components of the unit are carried, an element movable longitudinally of the wire and having means for fixably and slidably mounting said element within the valve shell passage in spaced relationship to said shoulder to require movement through said element of all air which flows through the shell passage in either direction, an annular seat presented by said element, a first closure member movable longitudinally of the wire to engage said seat to prevent outflow of air through the shell passage, a through aperture in said first closure member, a second closure member fixed to the wire and adapted to close said through aperture to prevent inflow of air through said aperture, and a compression spring acting between the first closure member and the wire forcibly to hold said closure members in contact, with the second closure member preventing outflow of air through the first closure member, until air pressure in the shell passage interiorly of the closure members has attained a predetermined maximum, air pressure in the shell passage interiorly of the closure members tending to maintain contact between the first closure member and the aforesaid annular seat and tending to separate the closure members, and a second compression spring having one end fixed in position by said shoulder in the tire valve shell and acting through the first compression spring so as to tend to maintain contact between the first closure member and the aforesaid annular seat and in opposition to the said first compression spring so as to tend to separate the closure members.

WILLIAM G. BUENIK.

REFERENCES CITED

The following references are of record in the file of this patent:

UNITED STATES PATENTS

| Number | Name | Date |
|---|---|---|
| 1,235,164 | Sessions | July 31, 1917 |
| 1,269,694 | Faires | June 18, 1918 |
| 1,284,079 | Feuser | Nov. 5, 1918 |
| 1,990,516 | Beckel | Feb. 12, 1935 |
| 2,028,755 | Crecca | Jan. 28, 1936 |
| 2,246,775 | Anderson | June 24, 1941 |
| 2,254,655 | Hollowell | Sept. 2, 1941 |
| 2,306,495 | Payne | Dec. 29, 1942 |